Patented June 16, 1936

2,044,082

UNITED STATES PATENT OFFICE

2,044,082

AZO DYES AND METHOD FOR THEIR PREPARATION

Arthur Howard Knight, Ashton-on-Mersey, Sale, England, assignor to Imperial Chemical Industries Limited, a corporation of Great Britain No Drawing. Application June 8, 1933, Serial No. 674,967. In Great Britain June 17, 1932

20 Claims. (Cl. 260—84)

This invention relates to new coloring materials and more particularly refers to secondary disazo dyes especially adapted for dyeing cellulose esters and ethers, and methods for their production.

It is an object of this invention to produce coloring materials which have excellent affinity for cellulose esters and ethers. A further object is to produce dyes which impart shades of satisfactory fastness to light and washing to textile materials. A still further object is to produce dyes which impart colors ranging from brown through red to reddish-violet to cellulose derivatives. Additional objects will become apparent from a consideration of the following description.

These objects are attained according to the herein described invention which in its preferred embodiment comprises coupling a diazotized amine of the benzene or naphthalene series with a dialkoxy aniline, diazotizing the resulting aminoazo compound and coupling it with an amine of the benzene series, the amino group of which has substituted thereon at least one beta-hydroxy-alkyl group. These dyes should be free from sulfonic and carboxylic acid groups.

The invention may be more completely understood by a consideration of the following illustrative examples, in which the quantities are stated in parts by weight:

Example 1

The solution obtained by diazotizing 143 parts of α-naphthylamine in the usual way was added to a solution of 153 parts of 2,5-dimethoxy-aniline in 370 parts of 10% hydrochloric acid and 6000 parts of water at 10° C. The combination was completed by the gradual addition of enough sodium acetate to correct the mineral acidity of the medium. When combination was complete, to the suspension of the monoazo compound so obtained was added 850 parts of 10% hydrochloric acid followed by 72 parts of sodium nitrite, the temperature being kept at 10° C. The mixture was stirred for about 4 hours when diazotization was complete. The suspension of the diazo-azo compound so obtained was then added to a solution prepared by dissolving 165 parts of N-ethyl-beta-hydroxy ethyl-aniline in 8000 parts of water and 370 parts of 10% hydrochloric acid, the temperature of the solution having been adjusted to 15° C. The mixture was stirred until combination was complete, sodium acetate being added from time to time to correct the mineral acidity of the medium. The dyestuff, which was out of solution, was then filtered off, washed with water, and either kept as paste or dried.

The dyestuff paste containing one part of the dyestuff prepared according to the above was added to a luke-warm dye bath containing a very small amount (about 1/100th part) of the substance obtained by condensing naphthalene sulfonic acid with formaldehyde (cf. Example 1 of British specification No. 224,077) and to the dye bath was then added 100 pounds of cellulose acetate yarn. The temperature was raised to 80° C. during half an hour, and the material was dyed for a further half hour at this temperature. It was then washed and dried in the usual way, giving a bluish-red dyeing of excellent fastness properties.

Example 2

138 parts of p-nitro-aniline were diazotized in the usual way and added to a solution of 153 parts of 2,5-dimethoxy-aniline in 370 parts of 10% hydrochloric acid and 6000 parts of water. When the combination was complete about 18,000 parts of water were added. The so diluted suspension of monoazo compound was heated to 50–60° C., 76 parts of sodium nitrite were then added, the mixture being stirred until diazotization was complete, the diazo-azo compound passing into solution. This solution was filtered, if necessary, and cooled to 20° C. It was then added to a solution of N-ethyl-beta-hydroxy-ethyl-aniline prepared as in Example 1. The mixture was stirred until combination was complete, sodium acetate being added from time to time to correct the mineral acidity of the medium. The dyestuff, which was out of solution, was then filtered off, washed with water, and preserved as paste. It dyed cellulose acetate in fast reddish-violet shades when applied in the manner described in Example 1.

Example 3

The solution obtained by diazotizing 127.5 parts of m-chloroaniline in the known way was added to a solution of 153 parts of 2,5-dimethoxy-aniline in 370 parts of 10% hydrochloric acid and 6000 parts of water at 10° C. When the combination was complete the suspension of the aminoazo compound so obtained was diluted with about 11,000 parts of water and the diluted suspension heated to 30° C. 76 parts of sodium nitrite were then added, the mixture being stirred until diazotization was complete, the diazo-azo compound passing into solution. This solution was filtered, if necessary, and cooled to 20° C. It was then added to a solution of 165 parts of N-beta-beta'-dihydroxy-diethyl-aniline in 740 parts of 10% hydrochloric acid and 8000 parts of water.

The mixture was stirred until combination was complete, sodium acetate was added from time to time to correct the mineral acidity of the medium. The dyestuff, which was out of solution, was then filtered off, washed with water, and preserved as paste. It dyed cellulose acetate in fast reddish-brown shades when applied in the manner described in Example 1.

Example 4

164 parts of p-amino-dimethyl-benzamide were diazotized in the usual way and slowly added to a suspension of 153 parts of 2,5-dimethoxy-aniline in 6000 parts of water to which 272 parts of sodium acetate have been added, the temperature of the suspension was 5° C. When combination was complete 1480 parts of 10% hydrochloric acid were added to the suspension of the monoazo compound so obtained and the suspension heated to 35° C. 76 parts of sodium nitrite were then added, the mixture being stirred until diazotization was complete, the diazo-azo compound passing into solution. This solution was filtered, if necessary, and cooled to 15° C. It was then added to a solution of 211 parts of N-beta-beta'-dihydroxy-diethyl-o-anisidine in 740 parts of 10% hydrochloric acid and 8000 parts of water.

The mixture was stirred until combination was complete and the dyestuff, which was out of solution, was filtered off, washed with water, and preserved as a paste. It gave orange-brown shades when applied to acetate silk in the manner described in Example 1.

Example 5

The solution obtained by diazotizing 143 parts of α-naphthylamine in the usual way was added to a solution of 153 parts of 2,5-dimethoxy-aniline in 370 parts of 10% hydrochloric acid and 6,000 parts of water at 10° C. The combination was completed by the gradual addition of enough sodium acetate to correct the mineral acidity of the medium. When combination was complete, to the suspension of the monoazo compound was added 850 parts of 10% hydrochloric acid followed by 72 parts of sodium nitrite, the temperature being kept at 10° C. The mixture was stirred for about 4 hours when diazotization was complete. The suspension of the diazo-azo compound thus obtained was then added to a solution prepared by dissolving 241 parts of N-beta-beta'-dihydroxy-diethyl-2,5-dimethoxy-aniline in 8,000 parts of water and 370 parts of 10% hydrochloric acid, the temperature of the solution having been adjusted to 15° C. The mixture was stirred until combination was complete, sodium acetate was added from time to time to correct the mineral acidity of the medium. When combination was complete the dyestuff suspension was rendered alkaline and the dyestuff filtered off, washed with water, and preserved as paste or dried in any suitable way.

It dyed cellulose acetate in fast violet shades when applied in the manner described in Example 1.

Example 6

138 parts of o-nitroaniline were diazotized in the usual way and added to a solution of 181 parts of 2,5-diethoxy-aniline in 370 parts of 10% hydrochloric acid and 24,000 parts of water. When combination was complete the suspension of monoazo compound was heated to 50° C., 76 parts of sodium nitrite were then added, the mixture being stirred until diazotization was complete, the diazo-azo compound passing into solution.

This solution was filtered, if necessary, and cooled to 15° C. It was then added to a solution of 225 parts of N-beta-beta'-dihydroxy-diethyl-m-amino-p-cresol-methyl-ether in 370 parts of 10% hydrochloric acid and 8,000 parts of water. The mixture was stirred until combination was complete, sodium acetate was added from time to time to correct the mineral acidity of the medium. The dyestuff suspension was then rendered alkaline, the dyestuff filtered off, washed with water, and preserved as paste or dried in any suitable way.

It dyed cellulose acetate in just yellowish-brown shades when applied in the manner described in Example 1.

Example 7

The solution obtained by diazotizing 127.5 parts of m-chloroaniline in the known way was added to a solution of 153 parts of 2,5-dimethoxy-aniline in 370 parts of 10% hydrochloric acid and 6,000 parts of water at 10° C. When the combination was complete the suspension of the aminoazo compound thus obtained was diluted with about 11,000 parts of water and the diluted suspension heated to 30° C., 76 parts of sodium nitrite were then added, the mixture being stirred until diazotization was complete, the diazo-azo compound passing into solution. This solution was filtered, if necessary, and cooled to 20° C. It was then added to a solution of 225 parts of N-beta-beta'-dihydroxy-diethyl-m-amino-p-cresol-methyl-ether in 370 parts of 10% hydrochloric acid and 8,000 parts of water, and followed by the addition of 408 parts of sodium acetate. When combination was complete the dyestuff suspension was rendered alkaline, the dyestuff filtered off, washed with water, and preserved as paste or dried in any suitable way. It dyed cellulose acetate in fast reddish-brown shades when applied in the manner described in Example 1.

The invention is further illustrated by reference to the following table of dyestuffs:

| First component | Middle component | End component | Shade when dyed on cellulose acetate |
|---|---|---|---|
| p-Anisidine | 2,5-dimethoxy-aniline. | N-ethyl-beta-hydroxy-ethyl-aniline | Red. |
| Beta-naphthylamine | do | do | Red-brown. |
| p-Anisidine | do | N-beta-beta'-dihydroxy-diethyl-aniline | Yellowish-red. |
| α-naphthylamine | do | do | Brown. |
| Beta-naphthylamine | do | do | Do. |
| 4-nitro-2-toluidine | do | do | Red-brown. |
| p-Nitroaniline | do | do | Brown. |
| p-Nitroaniline | do | N-ethyl-beta-hydroxy-ethyl-o-toluidine. | Do. |
| Aniline | do | N-beta-beta'-dihydroxy-diethyl-m-amino-p-cresol-methyl-ether. | Reddish-violet. |
| m-Amino-p-cresol-methyl ether. | do | do | Violet-brown. |
| p-Nitroaniline | do | do | Brown. |
| o-Nitroaniline | do | N-beta-beta'-dihydroxy-diethyl-2,5-dimethoxy-aniline. | Do. |

It is to be understood that the aforementioned examples are given merely for purposes of illustration, and are not intended to limit in any way the scope of the present invention. The components which may be utilized in producing the compounds described herein are exceedingly varied. For example in selecting the first component amines of the benzene or naphthalene series are preferably used. These amines may have one or more additional groups substituted thereon, but should be free from sulfonic or carboxylic acid groups. Among the various compounds which fall within this category mention may be made of the following:

Aniline
o-Chloroaniline
m-Chloroaniline
p-Chloroaniline
Cresidine
o-Toluidine
m-Toluidine
α-naphthylamine
β-naphthylamine
o-Anisidine
p-Phenetidine
2,5-dimethoxy-aniline
2,5-diethoxy-aniline
p-Amino-dimethyl-benzamide
o-Nitroaniline
m-Nitroaniline
p-Nitroaniline
m-Nitro-p-toluidine
2,4-dinitro-aniline
5-nitro-o-anisidine
o-Chloro-p-nitroaniline The second component is a dialkoxy aniline. It is desirable that coupling of this component should take place para to the amino group. Consequently the alkoxy group should not occupy the 4-position. Furthermore, it is to be understood that additional groups, other than the sulfonic and carboxylic acid groups, which do not prevent coupling from taking place may be substituted thereon. For optimum results, however, it is advisable to use a 2,5-dialkoxy aniline, 2,5-dimethoxy- or diethoxy-aniline being in general preferred.

The end component is an amine of the benzene series, the amino group of which has substituted thereon at least one beta-hydroxy-alkyl group. This component, likewise, should be free from carboxylic or sulfonic acid groups. However, with the exception of the aforementioned substituents it is possible to substitute numerous other well known groups thereon. While the amino group should have substituted thereon at least one beta-hydroxy-alkyl group, exceptionally good results have been obtained by substituting thereon two beta-hydroxy-alkyl groups, or one beta-hydroxy-alkyl group and one alkyl group. In order to illustrate a few typical compounds falling within this class mention may here be made of the following:

N-beta-beta'-dihydroxy-diethyl-aniline
N-ethyl-beta-hydroxy-ethyl-aniline
N-beta-hydroxy-ethyl-m-toluidine
N-beta-hydroxy-ethyl-o-anisidine
N-beta-beta'-dihydroxy-diethyl-o-anisidine
Beta-hydroxy-ethyl-aniline The beta-hydroxy-alkyl derivatives of aniline may be prepared by any of the well known methods. However, in preparing the N-beta-beta'-dihydroxy-diethyl-o-anisidine very good results have been attained by following the directions given by Von Braun and Seemann (Berichte, 55, 3821).

As previously mentioned, the individual components of the compounds comprised within the scope of the instant invention should be free from sulfonic and carboxylic acid groups. It is, therefore, to be understood that wherever in the present specification and claims reference is made to components which may be used according to the directions heretofore given, these components must be free from the aforementioned acid groups.

The dyes produced hereby are exceedingly fast to light and washing, and have excellent affinity for textile material, particularly cellulose esters and ethers. These compounds impart attractive shades ranging from brown through red to reddish-violet.

As many apparently widely different embodiments of this invention may be made without departing from the spirit and scope thereof, it is to be understood that I do not limit myself to the specific embodiments thereof except as defined in the appended claims.

I claim:

1. A process for producing azo dyes which comprises coupling a diazotized amine of the benzene or naphthalene series with a dialkoxy aniline, diazotizing the resulting amino-azo compound and coupling it with an amine of the benzene series, the amino group of which has substituted thereon at least one beta-hydroxy-alkyl group.

2. A process for producing azo dyes which comprises coupling a diazotized amine of the benzene or naphthalene series with 2,5-dialkoxy-aniline, diazotizing the resulting aminoazo compound and coupling it with an amine of the benzene series, the amino group of which has substituted thereon at least one beta-hydroxy-ethyl group.

3. The process of claim 2 wherein the second component is 2,5-dimethoxy-aniline, and the end component is a member selected from the group consisting of N-ethyl-beta-hydroxy-ethyl-aniline, N-beta-beta'-dihydroxy-diethyl-aniline, which members may have substituted thereon members selected from the group consisting of alkyl and alkoxy.

4. A process for producing azo dyes which comprises coupling diazotized alpha-naphthylamine with 2,5-dimethoxy-aniline, diazotizing the resulting amino-azo compound and coupling it with N-ethyl-beta-hydroxy-ethyl-aniline.

5. A process for producing azo dyes which comprises coupling diazotized para-nitro-aniline with 2,5-dimethoxy-aniline, diazotizing the resulting amino-azo compound and coupling it with N-ethyl-beta-hydroxy-ethyl-aniline.

6. A process for producing azo dyes which comprises coupling diazotized meta-chloroaniline with 2,5-dimethoxy-aniline, diazotizing the resulting amino-azo compound and coupling it with N-beta-beta'-dihydroxy-diethyl-aniline.

7. An azo dye having the following general formula:

$$A-N=N-X-N=N-B$$

in which A represents the residue of an amine of the benzene or naphthalene series, X represents the residue of a dialkoxy-aniline, and B represents the nucleus of an amine of the benzene series the amino group of which has substituted thereon at least one beta-hydroxy-alkyl group.

8. An azo dye having the following general formula:

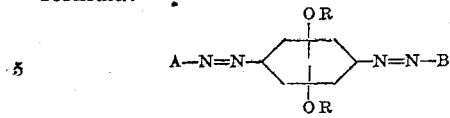

in which A represents the residue of an amine of the benzene or naphthalene series, R represents an alkyl group, and B represents the nucleus of an amine of the benzene series the amino group of which has substituted thereon at least one beta-hydroxy-alkyl group.

9. A water insoluble azo dye having the following general formula:

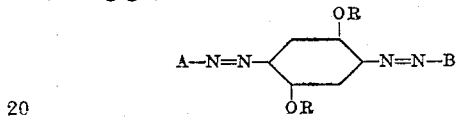

in which A represents the residue of an amine of the benzene or naphthalene series, R represents an alkyl group, and B represents the nucleus of an amine of the benzene series the amino group of which has substituted thereon at least one beta-hydroxy-alkyl group.

10. A water insoluble azo dye having the following general formula:

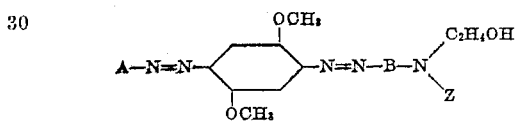

in which A represents the residue of an amine of the benzene or naphthalene series, B represents the residue of an amine of the benzene series, and Z represents an ethyl or a beta-hydroxy-ethyl group.

11. An azo dye having the following general formula:

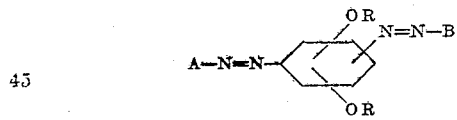

in which A represents the residue of an amine of the benzene or naphthalene series, R represents an alkyl group, and B represents the nucleus of an amine of the benzene series the amino group of which has substituted thereon at least one beta-hydroxy-alkyl group.

12. An azo dye having the following formula:

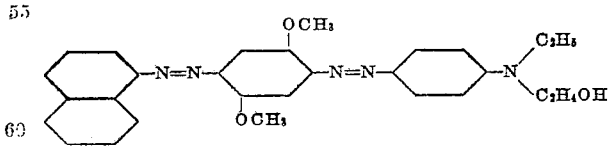

13. An azo dye having the following formula:

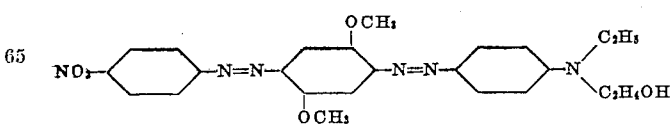

14. An azo dye having the following formula:

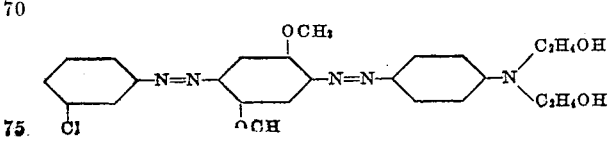

15. An azo dye having the following general formula:

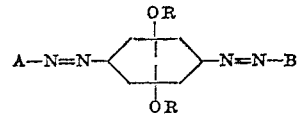

in which A represents the radical of a diazotized aromatic amine, R represents an alkyl group, and B represents the nucleus of an amine of the benzene series the amino group of which has substituted thereon at least one beta-hydroxy-alkyl group.

16. An azo dye having the following general formula:

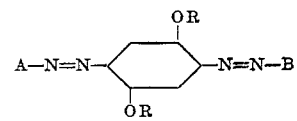

in which A represents the residue of a diazotized aromatic amine, R represents an alkyl group, and B represents the nucleus of an amine of the benzene series the amino group of which has substituted thereon at least one beta-hydroxy-alkyl group.

17. A water insoluble azo dye having the following general formula:

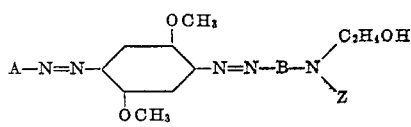

in which A represents the residue of a diazotized aromatic amine, B represents the residue of an amine of the benzene series, and Z represents an ethyl or a beta-hydroxy-ethyl group.

18. The process of producing secondary disazo dyes which comprises coupling a diazotized amine of the benezene or naphthalene series with an alkoxyaniline which couples in the position para to the amino group, diazotizing the resulting amino-azo compound, and coupling it with an amine of the benzene series, the amino group of which has substituted thereon at least one beta-hydroxy-alkyl group, all of the materials used being free from sulfonic and carboxylic groups.

19. The process of producing secondary disazo dyes, which comprises coupling a diazotized nitro-aniline with an alkoxyaniline which couples in the position para to the amino group, diazotizing the resulting amino-azo compound and coupling it with an amine of the benzene series which contains a beta-hydroxyethyl group attached to the amino group, all the materials used being free from sulfonic and carboxylic groups.

20. Secondary disazo dyestuffs free from sulfonic and carboxylic groups corresponding to the general formula:

$$X-N=N-Y-N=N-Z$$

wherein X represents the radical of a diazotized amine of the benzene or naphthalene series, Y is a radical derived from an alkoxy-aniline which couples in the position para to the amino group, to which the two —N=N— groups are attached para to each other, and wherein Z is a radical of the benzene series containing an amino group which is substituted by at least one beta-hydroxyethyl group.

ARTHUR HOWARD KNIGHT.